US008319622B2

(12) United States Patent
Kuhls et al.

(10) Patent No.: US 8,319,622 B2
(45) Date of Patent: Nov. 27, 2012

(54) SYSTEM FOR ENABLING THE FUNCTIONALITY OF A SEQUENCE CONTROL SYSTEM STORED IN A CONTROLLER OF A MOTOR VEHICLE

(75) Inventors: Burkhard Kuhls, Stadtbergen (DE); Josef Wagenhuber, Gerolsbach (DE); Marc Lindlbauer, Munich (DE); Hanno Schellenberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 779 days.

(21) Appl. No.: 12/275,811

(22) Filed: Nov. 21, 2008

(65) Prior Publication Data

US 2009/0134989 A1 May 28, 2009

(30) Foreign Application Priority Data

Nov. 24, 2007 (DE) ......................... 10 2007 056 662

(51) Int. Cl.
*B60Q 1/00* (2006.01)

(52) U.S. Cl. ...................................................... 340/439

(58) Field of Classification Search .................. 340/439, 340/438; 713/187, 175, 176, 193; 380/30, 380/255, 277
See application file for complete search history.

(56) References Cited

U.S. PATENT DOCUMENTS

| | | | | |
|---|---|---|---|---|
| 5,229,648 | A * | 7/1993 | Sues et al. | 307/10.2 |
| 7,549,046 | B2 * | 6/2009 | Fehr et al. | 713/168 |
| 7,721,098 | B2 * | 5/2010 | Lotspiech | 713/170 |
| 2002/0023223 | A1 * | 2/2002 | Schmidt et al. | 713/187 |
| 2002/0120856 | A1 * | 8/2002 | Schmidt et al. | 713/193 |

* cited by examiner

*Primary Examiner* — Phung Nguyen
(74) *Attorney, Agent, or Firm* — Barley Snyder

(57) ABSTRACT

A central check device is provided in a motor vehicle, to which device an enable message emitted by a first controller inside the vehicle or from a location outside the vehicle is supplied via a communication bus of the motor vehicle. The central check device evaluates the received enable message to identify the sequence control system to be enabled and the controller which comprises the sequence control system to be enabled. The central check device sends an enable command to the identified controller via the communication bus of the motor vehicle so as to enable the sequence control system which is to be enabled.

11 Claims, No Drawings

SYSTEM FOR ENABLING THE FUNCTIONALITY OF A SEQUENCE CONTROL SYSTEM STORED IN A CONTROLLER OF A MOTOR VEHICLE

CROSS-REFERENCE TO RELATED APPLICATIONS

This application claims the benefit of the filing date under 35 U.S.C. §119(a)-(d) of German Patent Application No. 102007056662.1, filed Nov. 24, 2007.

FIELD OF THE INVENTION

The invention relates to a system for enabling the functionality of a sequence control system stored in a controller of a motor vehicle.

BACKGROUND

In a known system for enabling the functionality of a sequence control system stored in a controller of a motor vehicle, a check routine is provided in each controller with an enablable sequence control system, which checks whether a received enable message is authentic. Such a system is associated with high costs for appropriate controllers.

An object of the invention is to provide an inexpensive system for enabling the functionality of a sequence control system stored in a controller of a motor vehicle.

SUMMARY

According to the invention, a central check device is provided in the motor vehicle, to which device an enable message emitted by a first controller inside the vehicle or from a location outside the vehicle is supplied via a communication bus of the motor vehicle. The central check device evaluates the received enable message to identify the sequence control system to be enabled and the controller which comprises the sequence control system to be enabled. The central check device sends an enable command to the identified controller via the communication bus of the motor vehicle so as to enable the sequence control system which is to be enabled.

The solution according to the invention makes it possible for controllers to comprise sequence control systems or functions which can be enabled without the risk of manipulation and without expenditure on special hardware and/or software. This is made possible by providing according to the invention in particular a single central controller in the motor vehicle which can perform the appropriate computationally intensive check routines and optionally emits corresponding enable messages.

DETAILED DESCRIPTION OF THE EMBODIMENTS

An embodiment of the invention provides a central check device in a motor vehicle. An enable message emitted by a first controller inside the vehicle or from a location outside the vehicle is supplied via a communication bus of the motor vehicle to the central check device. The central check device, using an evaluator, evaluates the received enable message to identify the sequence control system to be enabled and the controller which comprises the sequence control system to be enabled. The central check device sends an enable command to the identified controller via the communication bus of the motor vehicle so as to enable the sequence control system which is to be enabled.

In one embodiment of the invention the received enable message is encrypted with the private key of a public key key pair of the first controller or of an enable location outside the vehicle. The received enable message is decrypted using the complementary public key provided in the central check device so as to identify the sequence control system to be enabled and the relevant controller.

In one exemplary embodiment of the invention, the enable message includes the diagnostic address of the relevant controller and the relevant controller is identified on the basis of the diagnostic address.

In one development of the invention, the central check device requests a random number from the identified controller and the central check device forms a Message Authentication Code from sequence control system identification information identified during decryption of the enable message and from the random number on the basis of a communication key exchanged between the central check device and the identified controller. The Message Authentication Code is sent by the central check device together with the identified sequence control system identification information to the identified controller for enabling purposes.

In a further development of the invention, the identified controller checks the Message Authentication Code for authenticity and optionally enables the sequence control system using the identified sequence control system identification information.

As a result of the above measures, which further develop known procedures in an advantageous manner, the expenditure required to carry out the invention is further reduced.

In a preferred embodiment of the invention, the identified sequence control system forms at least part of an electronic motor vehicle immobiliser. This preferred embodiment of the invention, in which an enable message emitted by a first controller inside the vehicle is preferably supplied to the central check device, makes it possible to provide a reliable but nonetheless inexpensive immobiliser based on a plurality of controllers.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A system for enabling the functionality of a sequence control system stored in a controller of a motor vehicle, the system comprising:

- a central check device in the motor vehicle;
- an enable message emitted by a first controller inside the vehicle or from a location outside the vehicle being supplied via a communication bus of the motor vehicle to the central check device;
- an evaluator in the central check device which evaluates the received enable message to identify the sequence control system to be enabled and the controller which comprises the sequence control system to be enabled; and,
- an enable command sent by the central check device to the identified controller via the motor vehicle communication bus to enable the sequence control system which is to be enabled.

2. The system according to claim 1, wherein the received enable command is encrypted with the private key of the first controller or of an enable location outside the vehicle.

3. The system according to claim 2, wherein the received enable command is decrypted using a complementary public key provided in the central check device so as to identify the sequence control system to be enabled and the controller.

4. The system according to claim 1 wherein the enable command comprises a diagnostic address of the relevant controller and the relevant controller is identified on the basis of the diagnostic address.

5. The system according to claim 1, wherein the central check device requests a random number from the identified controller.

6. The system according to claim 5, wherein the central check device forms a Message Authentication Code from a sequence control system identification information identified during a decryption of the enable message and from the random number on the basis of a communication key exchanged between the central check device and the identified controller.

7. The system according to claim 6, wherein the Message Authentication Code is sent by the central check device together with the identified sequence control system identification information to the identified controller for enabling purposes.

8. A method of enabling the functionality of a sequence control system stored in a controller of a motor vehicle, the system comprising:

emitting an enable message from a first controller inside the vehicle or from a location outside the vehicle onto a communication bus of the motor vehicle to a central check device;

evaluating the received enable message to identify the sequence control system to be enabled and the controller which comprises the sequence control system to be enabled; and, sending an enable command from the central check device to the identified controller via the motor vehicle communication bus to enable the sequence control system.

9. The method according to claim 8, wherein the received enable message is encrypted with the private key of the first controller or of an enable location outside the vehicle.

10. The method according to claim 9, wherein the received enable message is decrypted using a complementary public key provided in the central check device so as to identify the sequence control system to be enabled and the controller.

11. The method according to claim 8 wherein the enable message comprises a diagnostic address of the relevant controller and the relevant controller is identified on the basis of the diagnostic address.

* * * * *